Nov. 25, 1958 T. E. JONES 2,862,100
MAGNETIC FORCE RESISTANCE WELDERS OF THE INERTIA
TYPE PROVIDED WITH FIXED AIR GAP
Filed Oct. 14,, 1957 2 Sheets-Sheet 1

INVENTOR.
Thomas Embury Jones
BY Gerald B. Tjoflat
His attorney

Nov. 25, 1958 T. E. JONES 2,862,100
MAGNETIC FORCE RESISTANCE WELDERS OF THE INERTIA
TYPE PROVIDED WITH FIXED AIR GAP
Filed Oct. 14, 1957 2 Sheets-Sheet 2

INVENTOR.
Thomas Embury Jones
BY Gerald B. Tjoflat
His attorney

United States Patent Office 2,862,100
Patented Nov. 25, 1958

2,862,100

MAGNETIC FORCE RESISTANCE WELDERS OF THE INERTIA TYPE PROVIDED WITH FIXED AIR GAP

Thomas Embury Jones, Cincinnati, Ohio, assignor to Precision Welder & Machine Company, Cincinnati, Ohio, a corporation of Ohio Application October 14, 1957, Serial No. 689,868

6 Claims. (Cl. 219—86)

This invention relates to magnetic force resistance welders and more particularly to a welder having an inertia electromagnetic force device having a fixed air gap between the stator and armature.

An object of this invention is to provide the movable electrode positioner rod of a resistance welder with an actuator for engaging the electrodes with the work, and an electromagnet having a stator and an armature, the latter being secured to and the former movable along the rod from a fixed position towards the armature but which has such mass that the rod, armature and stator actuate the rod in a direction to develop weld pressure on the work when the weld current flows.

Another object of the invention is to provide a welder as set forth in the preceding object in which the length of the air gap between the stator and the armature is fixed but adjustable.

A further object is to provide a welder as above set forth in which the rod is guided in antifriction bearings in the stator.

The foregoing and other objects of the invention will be apparent to those of ordinary skill in the art to which the invention pertains from the following description taken in conjunction with the accompanying drawings.

Figure 1:
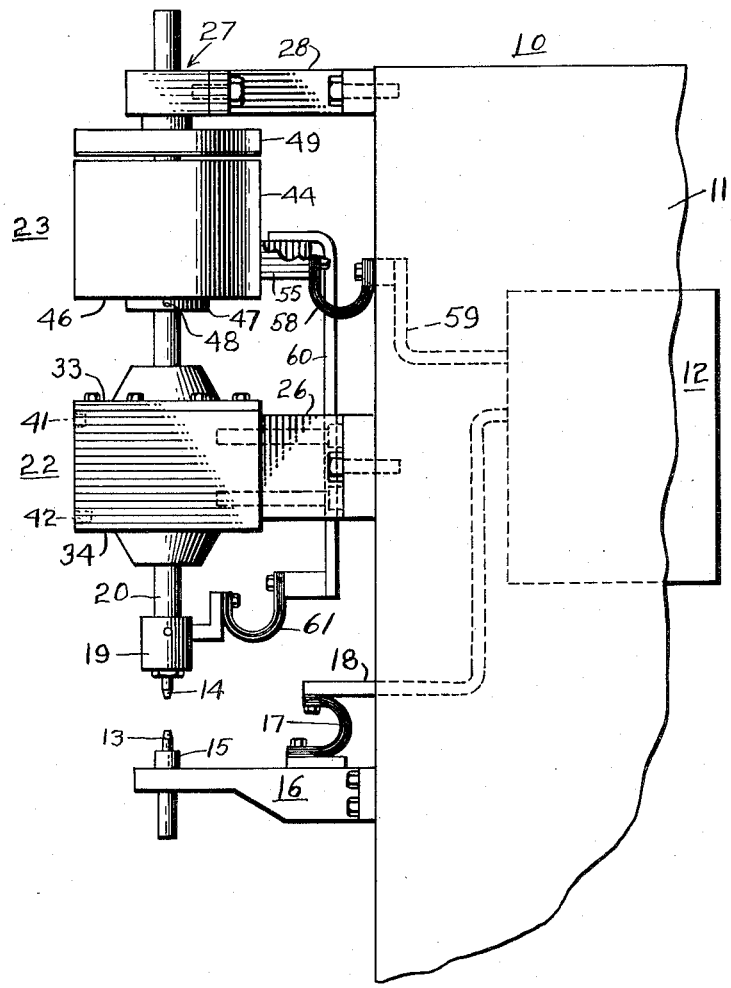
Figure 1 is a more or less diagrammatic fragmentary view, in side elevation, of a resistance welder provided with an electro-magnet embodying the invention.

In Fig. 1 of the drawings, a resistance welder 10 is shown that comprises a frame 11 on which is supported apparatus 12 for supplying weld current of controlled magnitude and duration to electrodes 13 and 14 when they are in work engaging position.

Electrode 13 is shown as stationary and supported in a holder 15 carried by a knee or bracket 16 mounted on the frame 11. The electrode 13 is connected to the voltage supply apparatus 12 through a flexible lead 17 and a cable 18.

Electrode 14 is attached to a holder 19 carried by a positioner rod 20 preferably of non-magnetic material. The rod is actuated to or from electrode engaging position with the work, by an actuator 22 such as a pneumatic or an hydraulic cylinder.

In order that the weld pressure or force may be applied to the work between the electrodes when weld current flows, the rod is provided with an electromagnet 23 having a winding 24 energized by the weld current. Rod 20 is guided in the actuator 22 which is secured to the frame 11 by a bracket 26, and by a bearing 27 mounted in a bracket 28 also secured to the frame.

The actuator 22 comprises a cylinder 29 having a piston 30 therein. The piston has limited motion along rod 20 between fixed stops 31 and 32. These stops may comprise snap rings which are retained in annular grooves (not shown) in the shaft. The cylinder heads 33 and 34 may be provided with spaced antifriction, linear action bearings 35—36 and 37—38 which serve as rod guides. The balls in these bearings engage the rod 20. Between the bearings 35—36 and 37—38 are seals 39 and 40, respectively, for sealing the rod against loss of operating fluid. Operating fluid is admitted through a port 41 at the top of the cylinder when the electrode 14 is to be actuated into engagement with work on electrode 13 and through a port 42 when the electrode 14 is to be retracted therefrom.

The lost motion provided by stops 31 and 32 allows the piston to engage the latter when moving downwardly until the electrode 14 engages the work. When that occurs, there is space between the top of the piston and stop 31 which fixes the amount of motion in the downward direction that may be imparted to rod 20 by the electromagnet 23, and supply the required weld pressure on the work between the electrodes.

Device 23 comprises a stator having an outer shell 44 and a central rod guide 45 connected at the lower ends by a wall 46. The stator is supported by a collar 47 secured to rod 20 by a set screw 48 or equivalent, whereby the collar may be adjusted in position along the rod. Device 23 also includes an armature 49 secured to the rod by any suitable means such as a pin 50. The stator can be adjusted towards the armature but it cannot move in the opposite direction past the collar 47.

The central rod guide 45 is a part of the stator and has a bore containing antifriction bearings 51 and 52 maintained in spaced relation by a sleeve 53. Thus the rod 20 may move freely through the stator without encountering friction drag.

The energizing winding 24 is preferably of a single turn of bar copper, or other suitable metal, received in the annulus formed between the shell 44 and the guide 45, and insulated therefrom as shown at 54. The coil terminals 55 and 56 extend through a vertical slot 57 in the shell 44. Terminal 55 may be connected to the voltage supply apparatus 12 through a flexible lead 58 and a cable 59. Terminal 56 may be connected to electrode holder 19 by a flexible connector 60 and a flexible lead 61.

The armature 49 is in form a circular plate having on its lower face a thin ring 49' of non-magnetic material such as copper. By it, the minimum air gap is limited.

The stator 44 is made heavy so that it will have sufficient mass to resist upward motion towards the armature when the coil is energized but will exert sufficient downward thrust on rod 20 through the armature to produce the desired weld pressure on the work when the weld current flows. Thus the armature and the stator move together with the rod in the weld pressure direction; therefore the air gap between the armature and the stator remain constant.

The positioner 22 and device 23 operate as follows.

When a weld is to be made, fluid pressure is admitted through port 41 causing the piston to engage stop 32 and move rod 20 and electrode 14 downwardly until the latter engages the work on electrode 13, thereby leaving a space between the upper stop 31 and the piston. When the weld current is applied, coil 24 is energized, but because of the inertia of the stator 44 it does not rise to the armature. Instead the attractive force is transmitted through the armaure to rod 20 whereby device 23 and the rod move downwardly, and the magnetic thrust so developed is applied to the weld. The magnitude of that thrust is controlled by the length of the air gap between the armature and the stator.

Figure 2:
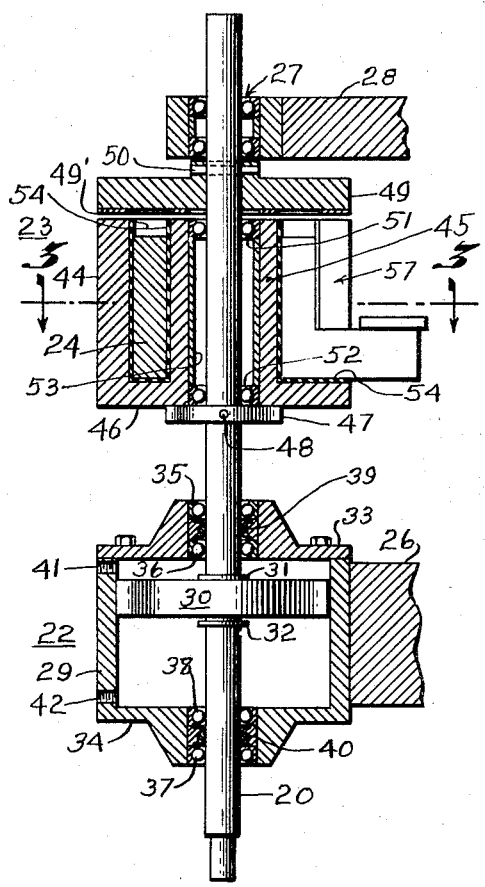
Fig. 2 is a view in vertical section of the electrode positioner and the electro-magnet assembly embodied in the welder of Fig. 1.
Figure 4:
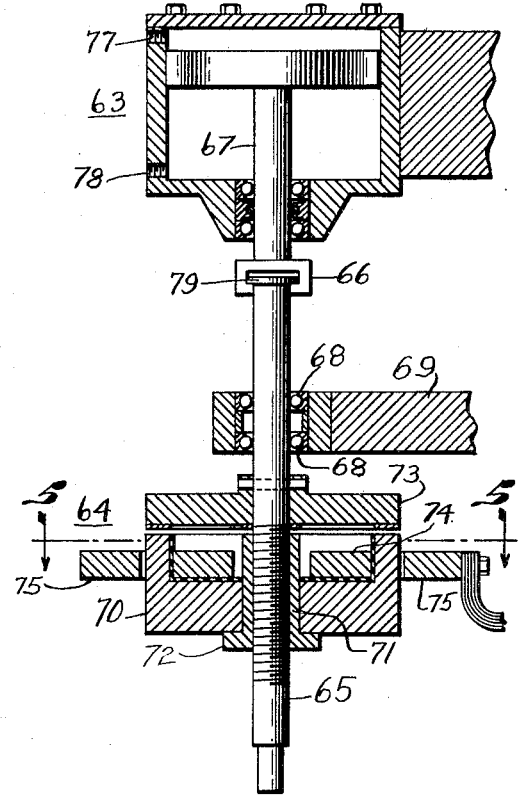
Fig. 4 is a view in vertical section of a modified form of the assembly shown in Fig. 2.
Figure 3:
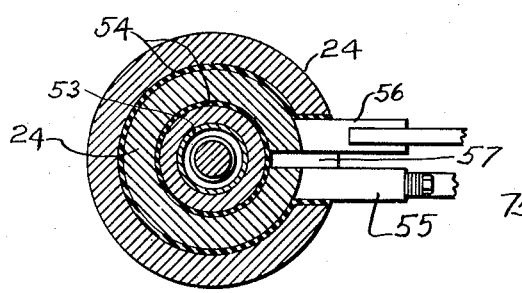
Fig. 3 is a view in section taken on line 3—3 of Fig. 2.
Figure 5:
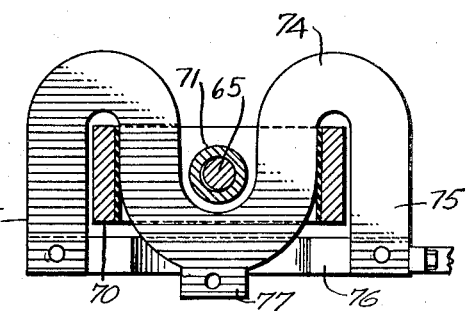
Fig. 5 is a view in section taken on line 5—5 of Fig. 4.

In Figs. 4 and 5 are illustrated a modification of the assembly of Figs. 2 and 3. In that form, the actuator 63 is above the magnetic force device 64 and the electrode positioner rod 65 is connected by a lost motion coupling 66 to the piston rod 67 of the actuator.

Rod 65 is guided in linear action antifriction bearings 68 carried by a bracket 69 adapted to be carried by the welder frame 11.

Device 64 comprises a U-shaped stator 70 having a central aperture for accommodating a bushing 71 having a flange 72 by which the stator is supported. The bushing is threaded on the rod so that the air gap between the stator and the armature 73 may be pre-adjusted.

The energizing winding for device 64 comprises a coil 74 of bar copper or equivalent material, having ends 75—75. These ends are connected by a jumper 76 and constitute one terminal of the coil, the other terminal being at 77. These terminals 76 and 77 may be connected to the cable 59 by a lead 76a and to the flexible lead 61, respectively, by the flexible connector 60 of Fig. 1.

The operation of the assembly of Figs. 4 and 5 is substantially the same as that described in connection with the assembly of Figs. 2 and 3. When the piston is moved downwardly under the influence of fluid pressure admitted through the port 77, the lost motion connection 66 engages the upper end of rod 65 and moves it downwardly until the electrode actuated by it is positioned on the work which has been placed on the electrode 13. The force applied by the piston is just enough to make firm contact between the work and the electrodes. Thus, when voltage is applied and current flows through the single turn winding 74, a thrust is developed on rod 65 through the armature 73, the stator 70 having sufficient mass to prevent its being moved towards the armature. That thrust is transmitted through electrode 14 to the work on electrode 13, and is sufficient in magnitude to provide the required weld pressure on the work.

When the rod 65 has been actuated by the device 64, the upper end of the rod will have moved downwardly against the bottom flange of the lost motion coupling 66. Thus, when the electrodes are retracted by supplying pressure medium to the underside of the piston of device 63, the rod 65 is retracted through engagement of the coupling 66 with the underside of a flange 79 at the upper end of the rod 65.

The magnetic force devices of the assemblies shown in Figs. 2 and 4 are compact and have an efficient magnetic circuit in that the armature and the stator and the coil windings therein produce a minimum of magnetic flux leakage. In either assembly it is preferred that the coil windings 24 or 74 should be shimmed upwardly towards the armature to a point as close to the top of the stator as feasible. The ampere turns thus developed by the coils are more effective, being closer to the armature. Thus the space shown in the drawings between the underside of the armatures and the top edge of the coils should be regarded as being as short as possible.

Having thus described the invention, what is desired to be secured by Letters Patent is:

1. A magnetic force resistance welder having relatively fixed and movable welder electrodes, means for moving one of the electrodes to or from welding position with respect to the other electrode, an electromagnet connected to said electrode moving means, said magnet comprising an armature fixed to the electrode moving means and a stator movably mounted thereon and having a coil winding therefor energizable by weld current, and stop means on said electrode moving means for supporting said stator at a fixed distance from the armature, the stator being movable toward the armature and having a mass of such value that the armature develops a force of such magnitude as to actuate the electrode moving means in a direction to exert weld pressure on the work through the electrodes while the stator follows and moves with said means.

2. A welder as in claim 1 in which the moving means includes a reciprocable rod for actuating one electrode towards or from weld engaging position of the electrodes, an actuator for the rod having a lost motion connection therewith and in which the electromagnet is connected to the rod at a location between the lost motion connection and the electrode end thereof.

3. A welder as in claim 1 in which the moving means includes a reciprocable rod adapted to carry at one end a welder electrode, and an actuator for the rod, there being a lost motion connection between the actuator and the rod, and the electromagnet comprises an armature supported by the rod in fixed position relative thereto and the stator comprises a magnetizable member of relatively large mass adjustably supported by the rod to provide a maximum fixed air gap between the armature and the stator, the mass of the stator being such that it follows the rod as it is moved by the actuator and develops force on the weld through the armature and the rod when the coil winding is energized.

4. A welder as in claim 3 in which the stator comprises a magnetic member having a central core and an outer wall spaced from the core to define an annulus for receiving the magnetizing winding.

5. A welder as in claim 3 in which the stator comprises a U-shaped member having a central guide for the rod and that the winding magnetically links the legs and guide of said U-shaped member.

6. A magnetic force resistance welder having relatively fixed and movable electrodes, means for moving one of the electrodes to or from welding position with respect to the other electrode, and a force producing electromagnet having a coil winding energizable by weld current, said electromagnet comprising an armature rigidly connected to the electrode moving means, a stator of relatively large mass and means movably supporting the stator from said electrode moving means, the stator supporting means fixing the maximum air gap between the armature and stator, the latter being movable towards the armature, the mass of the stator being of such value as to remain stationary relative to the electrode moving means while the armature develops and exerts weld pressure on the work while the stator follows and moves with said electrode moving means.

References Cited in the file of this patent
UNITED STATES PATENTS
2,776,362    Welch _____ Jan. 1, 1957

OTHER REFERENCES

"Welding Journal" (Funk) June 1957, pages 576–582 relied on.